United States Patent Office 3,446,593
Patented May 27, 1969

3,446,593
PROCESS FOR THE MANUFACTURE OF
MACROPOROUS VITREOUS CARBON
Gilberte Moutaud, Neuilly-sur-Seine, Hauts-de-Seine,
France, assignor to Societe le Carbone-Lorraine,
Paris, France, a French body corporate
No Drawing. Filed Jan. 7, 1965, Ser. No. 424,131
Int. Cl. C01b 31/00
U.S. Cl. 23—209.1                        11 Claims

ABSTRACT OF THE DISCLOSURE

Macroporous vitreous carbon is manufactured from a homogeneous carbon-yielding starting material in the form of a phenolic or furan resin on a macroporous support such as a polyurethane foam. The support is impregnated with the resin, if desired with a catalyst, so that when dried its weight of the resin becomes about ten times its original weight, and is left for 4 to 8 days until hardened. It is then heated at 5 to 10° C. per hour to 1200° C. in a reducing atmosphere until carbonised, whereby the support decomposes leaving a hard, amorphous, highly porous carbon.

---

The present invention relates to macroporous vitreous carbon and to a process for the manufacture thereof.

Vitreous carbon with a conchoidal structure is highly valued for the purpose of manufacturing parts of hard and impermeable carbon. One of the methods of manufacturing the vitreous carbon consists in slowly carbonising certain thermosetting resins in a reducing atmosphere, which produces dense, compact and impervious products.

It is an object of the present invention to provide an amorphous, hard, highly porous carbon. A further object is to provide an improved process for the manufacture of macroporous vitreous carbon.

According to the present invention a macroporous support, such as a polyurethane foam is impregnated by a thermosetting and cokefiable resin, and transformed in the course of a carbonisation into amorphous, vitreous carbon while the support slowly deteriorates and only leaves its structure in the final product.

For the support, a polyurethane foam with a specific gravity of 0.25 is chosen for example. The impregnant may be for instance, a thermosetting resin of the phenolic or furanic resin type, and particularly a furan resin such as that sold by Osgood under the name of Durez 16470.

Impregnation may be effected by any known means. It may be effected for example, by the simple immersion into a bath of added resin with 2% of a suitable catalyst. Possibly the impregnation is made in an autoclave where the vacuum and pressure are alternated. After impregnation, the excess impregnation resin may be driven out by drying. The weight of the impregnated and dried foam is equal to about 10 times its original weight.

The impregnant matter may possibly be diluted in a suitable solvent, such as benzene, for example.

The impregnated resin is left to rest for 4 to 8 days, in order that the polymerisation of the resin is effected and that the hardening is complete.

After polymerisation, the carbonization is proceeded according to classic methods, at 1,200° C., in a reducing atmosphere, having regard to an average heating speed of 5–10° C. per hour and possibly with a treatment of graphitisation of purification at higher temperature.

A foam of bright, hard, vitreous carbon, with a specific gravity of the order of 0.10 to 0.40 having a resistance to crushing of 5–20 kg./cm.$^2$, is obtained.

This macroporous material has its applications in the field of thermal insulation and in that of the construction of filters. Measures of permeability have been effected on samples in the form of discs with a diameter of 50 mm. and a thickness of 10 mm.

The permeability to gases is measured by the flow in litres per hour of gas traversing perpendicularly a section of 1 cm.$^2$ and a thickness of 1 cm. of the sample under a predetermined pressure.

PERMEABILITY TO GASES

| Pressures, mm.: | Flow in litres per hour |
|---|---|
| 5 | 32.8 |
| 10 | 49.6 |
| 20 | 76.5 |

PERMEABILITY IN WATER

| Pressures, g.: | Flow in litres per hour |
|---|---|
| 20 | 6.4 |
| 40 | 10.7 |

It will be readily understood by those skilled in the art that the foregoing specific embodiments of the invention are intended for purposes of illustration and that modifications therein can be made without departing from the scope of the invention as set forth in the appended claims.

I claim:
1. A process for the manufacture of macroporous vitreous carbon comprising impregnating a macroporous support of polyurethane with a thermosetting resin of the phenolic or furan type until its dried weight is about 10 times its original weight, allowing the impregnated support to stand for 4 to 8 days until the resin is hard and carbonising said impregnated support in an inert atmosphere, by heating to 1200° C. at an average heating speed of 5 to 10° C. per hour.
2. A process according to claim 1, wherein said macroporous support has a specific garvity of 0.25.
3. A process according to claim 1, wherein said thermosetting resin comprises a phenolic resin.
4. A process according to claim 1, wherein said thermosetting resin comprises a furan resin.
5. A process according to claim 1, wherein said impregnating resin is applied in a solvent.
6. A process according to claim 1, wherein to said impregnating resin is added a suitable catalyst and the impregnation is carried out in an autoclave under alternating vacuum and pressure.
7. A process according to claim 4, wherein said atmosphere is a reducing atmosphere.
8. A process according to claim 1, wherein the carbonised product is subjected to a treatment of graphitisation at a higher temperature.
9. A process according to claim 1, wherein the carbonised product is subjected to a treatment of graphitisation with simultaneous purification at a higher temperature.
10. A process according to claim 7, wherein the carbonised product is subjected to a treatment of graphitisation at a higher temperature.
11. A process according to claim 7, wherein the carbonised product is subjected to a treatment of graphitisa- tion with simultaneous purification at a higher temperature.

References Cited

UNITED STATES PATENTS

| | | | |
|---|---|---|---|
| 2,761,848 | 9/1956 | Bushong et al. | 23—209.1 X |
| 3,089,195 | 5/1963 | Woodburn | 264—29 |
| 3,111,396 | 11/1963 | Ball | 23—209.1 X |
| 3,121,050 | 2/1964 | Ford | 202—33 |
| 3,219,731 | 11/1965 | Etzel et al. | 264—29 |
| 3,302,999 | 2/1967 | Mitchell | 23—209.2 |
| 3,342,555 | 9/1967 | McMillan | 23—209.4 |

EDWARD J. MEROS, *Primary Examiner.*

U.S. Cl. X.R.

23—209.2, 209.4; 264—29